March 17, 1959
J. R. OISHEI
2,877,485
WINDSHIELD CLEARING SYSTEM
Filed Sept. 30, 1953
3 Sheets-Sheet 2
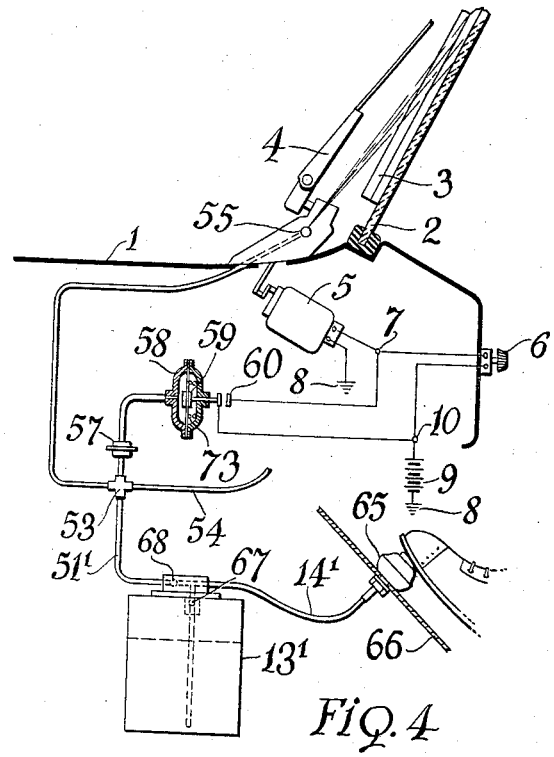
Fig. 4
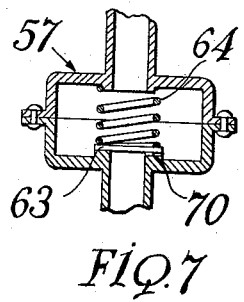
Fig. 7
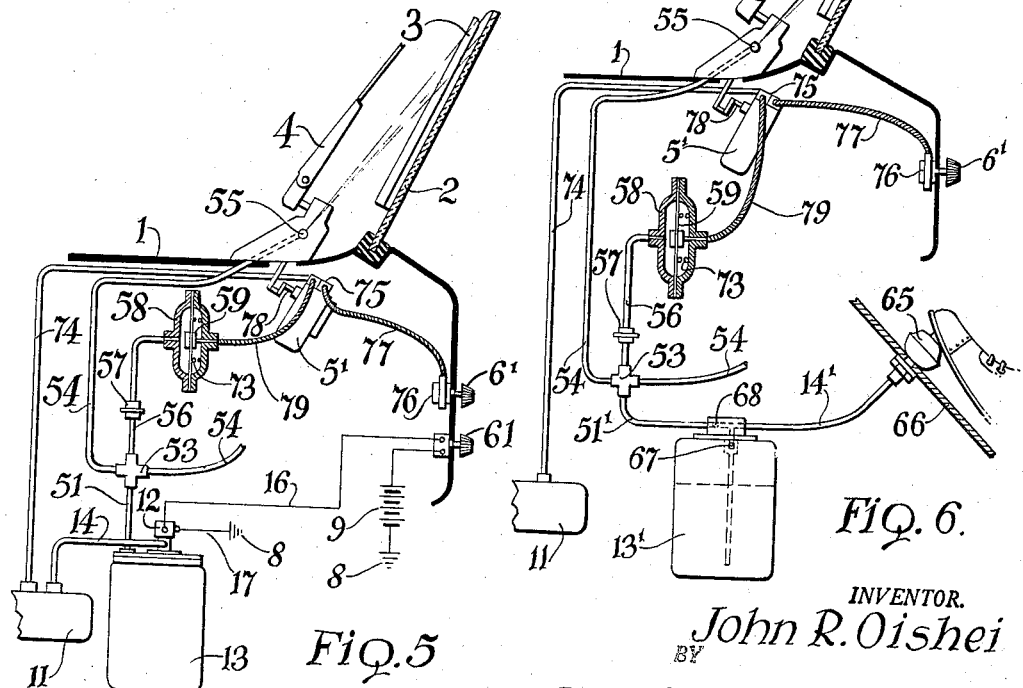
Fig. 5
Fig. 6
INVENTOR.
John R. Oishei
BY
Bean, Brooks, Buckley & Bean
attys.

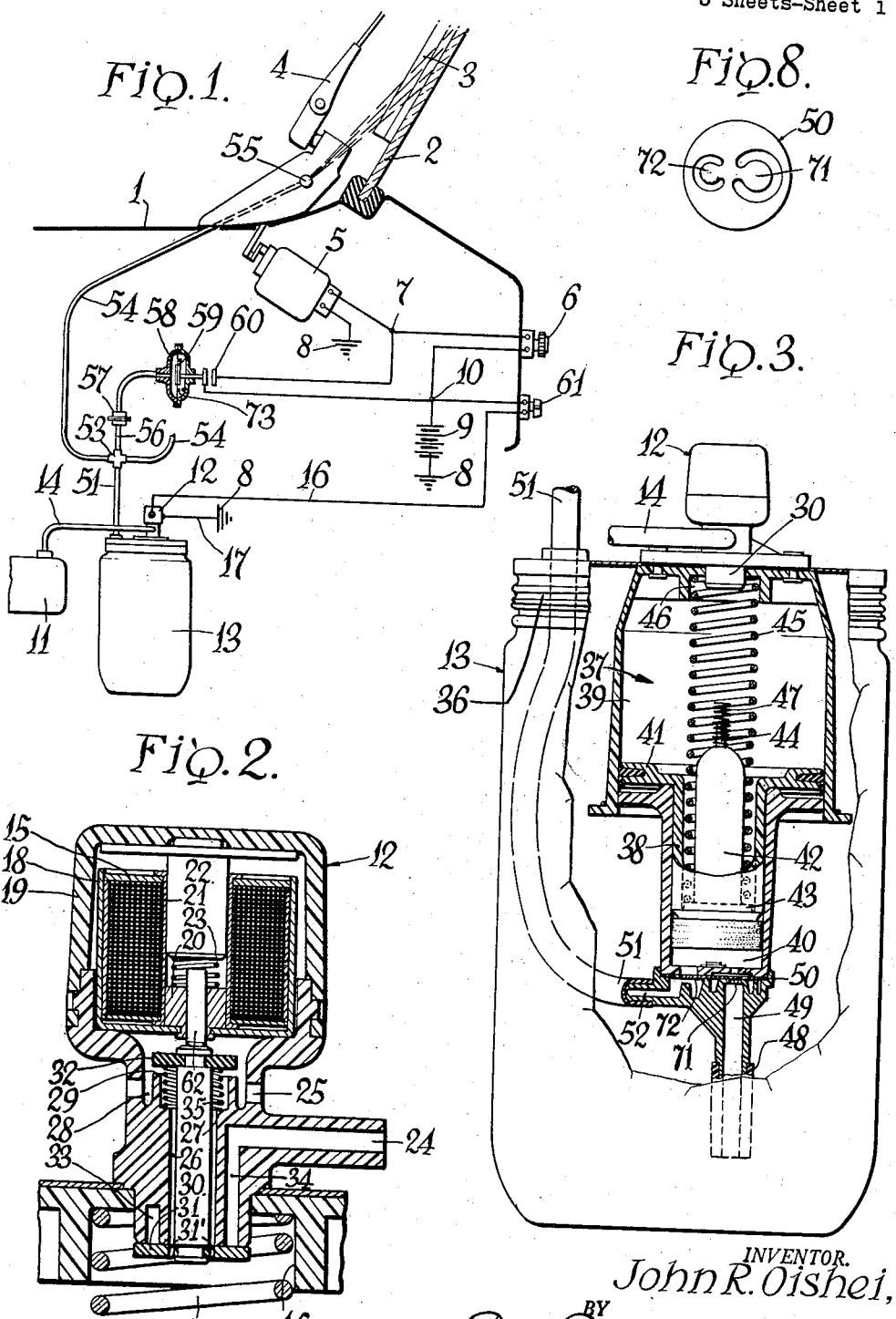

March 17, 1959
J. R. OISHEI
2,877,485
WINDSHIELD CLEARING SYSTEM
Filed Sept. 30, 1953
3 Sheets-Sheet 3
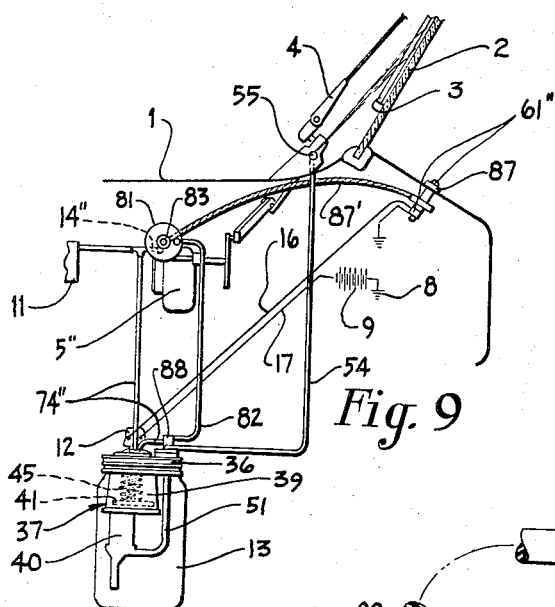
Fig. 9
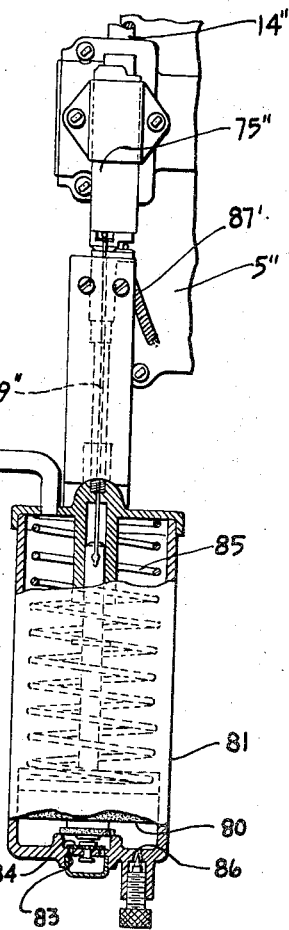
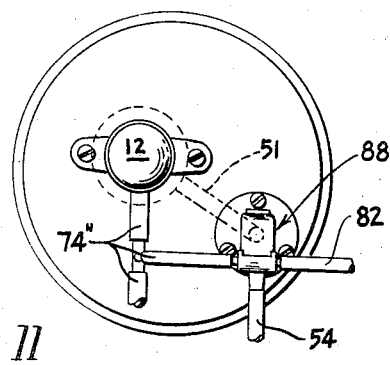
Fig. 11
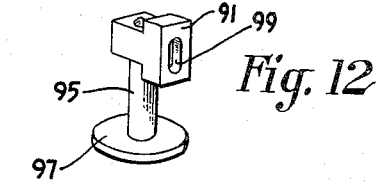
Fig. 12
INVENTOR.
JOHN R. OISHEI
BY
Bean Brooks Buckley & Bean.
ATTORNEYS

United States Patent Office 2,877,485
Patented Mar. 17, 1959

2,877,485

WINDSHIELD CLEARING SYSTEM

John R. Oishei, Buffalo, N. Y., assignor to Trico Products Corporation, Buffalo, N. Y.

Application September 30, 1953, Serial No. 383,157

38 Claims. (Cl. 15—250.4)

This invention relates to a windshield clearing system wherein means are provided for wetting the windshield surface for coacting with the windshield wiper, this being an improvement on the disclosure of my earlier Patent No. 2,743,473 wherein a suction operated coordinating control is employed for bringing the windshield wiper unit into operation concurrently with the washer unit.

Briefly, the washer unit of this earlier disclosure embodies a pump having a suction operated charging stroke and a spring returned discharging stroke. At the end of its charging or intake stroke an automatic valve is tripped to interrupt the suction communication and to vent the chamber of the pump motor to the atmosphere to enable the spring to effect the discharge of the liquid solvent. The coordinator is connected to the source of suction through the motor chamber and will turn on the wiper unit before the windshield washer piston reaches the point of tripping its automatic valve. This is obvious because of the fact that at the instant the washer automatic valve is tripped, the vacuum available for the coordinator piston will immediately drop to zero, and therefore it is necessary for the coordinator to turn on the windshield cleaner before the washer automatic valve trips.

The source of fluid pressure, such as an engine driven pump or the intake manifold, varies in accordance with the operating conditions of the power plant, the degree of suction changing in accordance with the speed of the pump but inversely in accordance with throttle position changes. When the engine is laboring in making a long ascent, the combined fluid displacement requirement of both the pressure operated washer unit and the pressure operated coordinating unit cannot always be met concurrently by the source of pressure. A failure may occur when the system is operating on a limited vacuum displacement, and especially when the limited source is augmented by the rarefied atmosphere of higher altitudes where a small reduction in the barometer reading reduces the pump capacity to a still lower level. Thus, it will be realized that should the wiper be turned on before the operation of the automatic valve of the washer, the running of the cleaner will use displacement air to such an extent that the reduced supply of suction may be insufficient to effect the full stroke of the washer piston.

Again, in the earlier used coordinated wiper and washer systems, should the reservoir supply of water be exhausted when the coordinated system is turned on, the pump will fail to spray the windshield but the wiper will nevertheless operate and smear soft deposits of vision obscuring matter within its path across the line of sight and becloud the field of vision.

The primary object of this invention is to provide a coordinated windshield washer and wiper system wherein the wiper coordinating mechanism is dependent upon the presence of liquid solvent in the system and is responsive to a delivery pressure thereon sufficient to bring the wiper or wipers into use, thereby to insure a surface wetting whenever a joint action is demanded. Otherwise, a failure in the water supply will react to bar an operation of the wiper.

A further object of this invention is to provide a dependable coordinated system to give a positive sequential operation of, first, a windshield washer unit which is operable during a given interval for the delivery of liquid onto a windshield, and secondly, a coordinator for turning on a windshield wiper unit during such interval and continuing its operation thereafter for a timed cycle to insure the wiping and drying of the windshield before the wiper unit is turned off.

A still further object of the system is to provide entirely separate periods of fluid energized operation for each of the fluid pressure operated units in sequential order thereby to utilize the full value of the available suction on each unit throughout the sequence and without interference between the units.

The purpose and aim of the present invention are to provide a windshield clearing system wherein the functioning of the washer unit is assured to wet the windshield surface preliminary to the scrubbing and cleaning action of the wiper unit which action quickly follows through the subsequent operation of the coordinator.

Therefore, an important object of the invention is to provide a windshield clearing system wherein the cleaner coordinating unit is made responsive to the liquid solvent flow from the washer unit in carrying out the desired sequence of operations.

Generally, the sequence of operations is as follows: a manual control is provided in the form of a touch button switch which when pressed closes a circuit to a pump motor for energizing it to start the flow of washing fluid. Thereafter, the hydrostatic pressure in the pump delivery reacts upon a wiper motor control to start the wiping means in operation.

In one form of the invention the pump motor is illustrated as a compressible rubber bulb which is normally charged, and when it is compressed the hydrostatic pressure acts upon a wiper motor control to start the wiper.

In another embodiment, the initial pump action charges the pump with a liquid solvent and at the same time compresses a motor spring for storing up potential energy therein. This first evacuation of the liquid pump motor has to be completed before any other use is made of the source of suction to energize the other units in the system. Upon the completion of the charging stroke of the washer piston achieved by the evacuation, the piston trips the suction valve to restore it to its normal position wherein the suction is shut off and the pump motor chamber is vented to the atmosphere. This venting releases the stored-up energy of the spring to drive the piston of the pump in its downward stroke for ejecting the solvent through jets onto the windshield and in so doing placing the liquid in the delivery passage from the pump under pressure. The pressurized liquid in this delivery passage is employed to start the wiper unit, as by closing either a switch for an electric wiper motor or a valve for a fluid wiper motor. Both the switch and the valve have return springs to restore them to their normal inoperative positions when the delivery pressure dissipates.

In a third modification a pump like that described in the second embodiment is used to open a normally closed pressure responsive valve for energizing a pressure actuated coordinator which latter ultimately turns on the wiper motor. In so doing a second spring in the pressure responsive valve and a third spring in the coordinator are compressed to restore the parts thereof to normal position after the functioning of the pump spring and the hydraulic pressure is spent. This sequence of operations takes place to the end that, when the pressure responsive valve is moved to connect the source of suction to the coordinator, the coordinator piston will open the control valve of the windshield wiper motor and simultaneously compress the third spring for subsequent expenditure in restoring the coordinator piston to its normal position after a given time interval. Thus in this automatic sequential operation, the three springs will be compressed in turn for restoring the parts to their normal positions.

For a better understanding of this and other objects of the invention, reference is made to the following specification and accompanying drawings wherein:

Fig. 1 is a schematic representation of a motor vehicle equipped with a windshield clearing system constructed in accordance with the present invention;

Fig. 2 is a sectional view of the valve system employed in the washer unit;

Fig. 3 is a fragmentary sectional view of the washer unit to a smaller scale than Fig. 2;

Fig. 4 is a schematic representation of a modified form of the invention;

Figs. 5 and 6 are schematic representations of the invention illustrating how it may be adapted for use in conjunction with a fluid pressure type wiper motor;

Fig. 7 is a sectional view of the bleed valve;

Fig. 8 is a plan view of the stop valve;

Fig. 9 is a schematic view showing a further modification;

Fig. 10 is a fragmentary sectional view of the coordinator and its hydrostatic control;

Fig. 11 is a top plan view of the washer unit; and

Fig. 12 is a detailed perspective view of the valving part of the hydrostatic valve.

Like reference numerals designate like elements throughout.

Referring now more particularly to the drawings, the numeral 1 designates the cowl of a motor vehicle and 2 the windshield mounted thereon. A wiper unit comprises a wiper blade 3, an arm 4, and an electric motor 5. When it is desired to merely utilize the wiper, the operator depresses switch 6. This closes a circuit through junction 7, electric motor 5, ground 8, battery 9, junction 10 and switch 6. The wiper will continue to oscillate until the switch is again depressed, breaking the circuit.

The washer unit depicted in Fig. 1 is suction actuated and herein connected to the intake manifold 11 of the engine by a valve 12 on the washer reservoir 13 and a hose 14. Referring now to Fig. 2, valve 12 contains a solenoid 15 and leads 16 and 17 connected into a circuit for the washer unit in a conventional manner as shown in Fig. 1. Solenoid 15 is surrounded by cylindrical housing 18, closed at one end, and the entire assembly is enclosed in casing 19. Bushing 20 is press fit into the lower portion of an axial bore 21 in solenoid 15. Bushing 20 and housing 18 are both provided with bores coaxial with that of bore 21, but of a lesser diameter, for a purpose to be set forth below. Cylindrical armature 22 is located in the upper portion of bore 21, the tolerance therebetween being sufficient to allow complete freedom of movement for the armature. Compression spring 23 is placed between bushing 20 and armature 22, urging the latter upward. Pin 62 is placed in the bores provided therefor in bushing 20 and housing 18, and is of a length sufficient to extend beyond the bores. The lower portion of casing 19 contains suction passage 24 which is connected to intake manifold 11 by hose 14. Above the suction passage is a series of venting orifices 25 which are open to the atmosphere for a purpose to be later described. The lower portion of casing 19 is provided with a bore 26 coaxial with that of solenoid 15 and counterbored at one end to provide shoulder 27. Circumferential groove 28, concentric with bore 26 interconnects vents 25 and provides shoulder 29. Valve element 30 having valve members 31 and 32 at its respective ends is located within bore 26, considerable clearance being allowed between the element and bore. The dimensions of valve member 32 are such that it just overlies shoulder 29, but does not cover groove 28. The diameter of valve member 31 is equal to that of the portion of the casing which it abuts. Valve member 31 contains a plurality of perforations 31' which connect bore 26 with reservoir 13 when the valve is closed, for a purpose to be hereinafter disclosed.

Circumferential groove 33 is cut in the lower extremity of the casing, and is connected to suction passage 24 by the longitudinal passage 34. Compression spring 35 resting upon shoulder 27 abuts the underface of piston 32, urging the latter upward. Pin 62 normally rests upon the upper surface of valve member 32 so that a gap exists between its upper surface and armature 22 when the solenoid is deactivated.

As best illustrated in Fig. 3, the pump 37 of the washer unit has a compound chamber with an upper portion 39 of comparatively large diameter and a lower coaxial portion 40 of smaller diameter. Valve 12 is affixed to the top 36 of reservoir 13, with valve element 30 extending into chamber portion 39. A hollow plunger 38 having a flanged upper face 41 is positioned within the lower chamber or portion 40 and extends into the upper portion 39 thereof.

Valve actuator 42 having a flanged face 43 at one end is located within plunger 38. Actuator pin 44 is located at the opposite end of the valve actuator and extends beyond the plunger into the upper chamber or portion 39 of the compound chamber. Compression spring 45 bears against the top of chamber 39 at one end, and against the flanged face 43 of the valve actuator at its other end, urging said actuator and the plunger 38 downwardly. A shoulder 46 is provided in the upper chamber to act as a guide for the spring. A comparatively weak helical spring 47 surrounds the actuator pin 44 and extends therebeyond. Hose 48 attached to the inlet nipple 49 connects the reservoir to the pump. Flap valve 50, best seen in Fig. 6, controls the flow of fluid to and from the chamber. Flap 71 of the valve permits the free flow of fluid from the reservoir into the chamber, but prevents the flow of fluid in the opposite direction. Concurrently, flap 72 permits the flow of fluid out of the chamber, but prevents the reverse flow of the fluid. Hose 51 is attached to nipple 52 of the chamber at one end, and to fitting 53 at its other end as illustrated in Fig. 1. Hoses 54 lead from the fitting to the nozzles, one of which is shown at 55.

In accordance with the present invention the coordinating motor is made responsive to the washer as it delivers the solvent to the windshield. This not only assures the wetting of the windshield surface initially but it also precludes the operation of the wiper unit until the fluid pressure actuation of the washer unit has been completed. A sequence of operations is thereby obtained wherein the source of fluid pressure is called upon to operate the washer and wiper units individually and to complete the fluid actuation of one unit before applying the fluid pressure to the other unit. To this end a hose 56 leads from the fitting to a combined check and bleed valve 57, and thence to a coordinator 58 at one side of a flexible diaphragm 59. Diaphragm 59 is rigidly connected to micro-switch 60.

When the operator of the vehicle desires to clear the windshield, he depresses and then releases switch 61. This momentarily closes a circuit through switch 61, lead 16, solenoid 15, lead 17, ground 8, battery 9, junction 10 and switch 61. The resultant activation of solenoid 15 causes armature 22 to move downward against the resistance of spring 23 until it strikes pin 62. Since the circuit is only closed momentarily, the armature is immediately moved back to the position illustrated in Fig. 2 by spring 23. Pin 62 upon being struck engages valve element 30 and lowers it against the resistance of spring 35 until valve member 32 abuts shoulder 29. Access to the atmosphere from chamber 39 may normally be had via perforations 36 in valve member 31, the clearance between the spacer of valve element 30 and casing 19, and vents 25. However, as valve member 32 is momentarily bearing against shoulder 29 this passage is cut off. When valve member 32 contacts shoulder 29, valve member 31 uncovers the circumferential groove 33 and the air in the upper chamber 39 is withdrawn via groove 33, passage 34, and suction passage 24 which is connected to the intake manifold 11 by hose 14. Because of the withdrawal of air, a pressure differential is created between the top surface of valve member 32 which is exposed to the atmosphere via groove 28 and vents 25, and the underside of the valve member which is exposed to the vacuum created in chamber 39. This pressure differential is sufficient to hold the valve in its lowered position against the force of spring 35.

The existence of a vacuum in upper portion 39 also creates a pressure differential across the flanged face 41 of plunger 38, since its upper surface is exposed to the vacuum while its lower surface is exposed via hose 48 to the atmospheric pressure present in reservoir. As a result of this pressure differential, plunger 38, carrying valve actuator 42 with it, is forced upward against the resistance of spring 45, and fluid is drawn into the lower portion 40 via hose 48 and flap valve 50, flap 71 raising to permit the entrance of the fluid. Concurrently, the pressure differential forces flap 72 into tight engagement with the underside of the chamber so as to prevent the flow of fluid from hose 51 back into the chamber.

As the plunger moves upward, spring 47 impinges upon and is compressed by valve 30, 31, 32. Then actuator pin 44 strikes the valve moving it upward to the position illustrated in Fig. 2. The suction passage is now closed and the upper portion 39 is exposed to atmospheric pressure via vents 25, circumferential groove 28, the clearance between the valve element 30 and the casing, and perforations 31' in the lower valve member 31. This results in the dissipation of the pressure differentials and plunger 38 carrying valve actuator 42 with it commences to move downward under the urging of spring 45, forcing the fluid which had previously been drawn into the chamber out into hose 51, flap 72 lowering to permit the flow. Flap 71 is forced into tight engagement with nipple 49 by the fluid pressure and prevents the return of fluid to the reservoir. To insure a complete destruction of the vacuum and so prevent the valve from snapping back to the closed position after pin 44 has moved downward, the valve is held open positively for a short interval by spring 47.

The fluid being forced out of chamber 37 passes through hose 51, fitting 53 and hoses 54 to nozzles or jets 55 from which it is applied to the windshield. Some of the fluid passes from the fitting into hose 56 and thence to bleed valve 57. As illustrated in Fig. 7, the fluid under pressure raises gate 63 against the force of spring 64 and passes out of the bleed valve into coordinator 58 where it deflects the flexible diaphragm 59 to the right closing micro-switch 60. This completes an electric circuit from micro-switch 60 through junction 7, motor 5, ground 8, battery 9 and junction 10 back to micro-switch 60, and the wipers 3 connected to motor 5 commence oscillating.

When the plunger 38 reaches the bottom of its stroke, the fluid in the various hoses is no longer under pressure and therefore attempts to return to the reservoir. However, when the pressure is released, gate 63 of the bleed valve 57 returns to its seat under the urging of spring 64, leaving only the constricted passage 70 available for the fluid returning from the coordinator 58. As a result, the return flow is highly restricted and the diaphragm returns to its normal position very slowly. The advantage of including the bleed valve in the system is that it maintains the wiper circuit closed until after the flow of clearing fluid to the windshield has ceased. The extra strokes of the wiper permitted thereby insures the elimination of all moisture from the windshield. To insure the ultimate opening of the wiper circuit, a light spring 73 is employed to constantly urge the diaphragm back to its normal position as illustrated in Fig. 1.

A modified form of the invention is disclosed in Fig. 4. Herein, a mechanically actuated washing unit is employed. The pump is in the form of a suction bulb 65 and may be located on the floor board 66 of the vehicle proximate to the headlight dimmer switch. When the operator desires to clear the windshield he depresses the plunger of the suction bulb with his foot as illustrated. When the plunger is released, fluid is drawn from reservoir 13', past ball valve 67 into the bulb via hose 14'. The fluid is prevented from entering hose 51' by ball valve 68 which is held closed by a light spring, not shown. When the plunger is again depressed, the fluid is ejected from the bulb, passing through hose 14', ball valve 68 which opens against its spring because of the hydraulic pressure, hose 51', fitting 53, and hoses 54 and 56 to the jets and diaphragm chamber respectively. The remainder of the clearing cycle is as described above. It may be noted that when the suction bulb plunger is released at the termination of the ejection stroke, fluid is again drawn into the bulb from the reservoir and the system is primed for a subsequent clearing operation.

Figs. 5 and 6 indicate how the invention may be adapted for use in conjunction with a fluid pressure type wiper motor of the type commonly employed on present day motor vehicles. Conduit 74 interconnects the intake manifold 11 and throttle valve 75 of motor 5'. When the operator of the vehicle desires to utilize the wiper he rotates element 6' which is connected to a pinion enclosed in casing 76. The rotation thus imparted to the pinion is converted to translation by a rack enclosed in the casing and rigidly attached to Bowden cable 77 so as to convey the motion thereto. Since the opposite end of the Bowden cable is connected to the wiper motor control or throttle valve, the latter is thus moved to the "on" position intercommunicating the motor 5' and intake manifold 11 via conduit 74. Rotation at element 6' in the opposite direction causes the throttle valve to move to the "off" position.

With the vehicle in operation and throttle valve 75 in the "on" position, the vacuous condition of the manifold causes the withdrawal of air from motor 5'. A system of valves embodied in the motor permits this withdrawal from only one side of a piston located within the motor while maintaining atmosphere pressure on the opposite side of the piston. As a result, the piston moves toward the low pressure side of the motor imparting motion to the wiper arm 4 via drive shaft 78. When the piston reaches the end of its stroke, the valves reverse so as to permit the withdrawal of air from that side of the piston which was formerly exposed to the atmosphere and as a result the piston moves in the opposite direction.

When the operator of the vehicle desires to utilize the windshield washer, he depresses the coordinating control means, such as the switch 61 in the embodiment disclosed in Fig. 5 or suction bulb 65 in the embodiment illustrated in Fig. 6. This will initiate a conjoint action by the actuation of the washer pump as disclosed above and the subsequent deflection of diaphragm 59 against the resistance of spring 73 under the hydrostatic pressure to start the wiper motor. Since the pressurized liquid is trapped within the coordinator chamber 58, the wiper unit will continue its operation as the pump continues its discharge stroke or cycle under the power of spring 45. The unit 58, 59, 60 therefore serves as a hydrostatic coupler for bringing the wiper motor into timed action with respect to the operation of the pump means. Bowden cable 79 rigidly attached to the diaphragm transmits the motion to throttle valve 75, moving the latter to its "on" position so as to intercommunicate the motor and intake manifold and the motor commences operation. At the termination of the washing cycle the hydrostatic pressure in coordinator chamber 58 drops and the diaphragm moves back to its original position as disclosed above, causing the throttle valve to be returned to its "off" position by Bowden cable 79 and the motor 5' ceases operating.

Referring now to Figs. 9 through 12, a modified coordinator unit is shown, the same being associated with the control throttle or slide valve 75" of the wiper motor 5" for turning on the latter and comprising an air or suction motor having a piston 80 operating within a cylinder 81 and connected by a Bowden cable 79" to the control 75" for rendering the wiper unit operative. The motor chamber 81 of the coordinating motor is connected to the source of suction 11 by the conduits 74" and 82, which open into the chamber at one side of the piston 80, the opposite side being open to the atmosphere through a port 83 that is normally closed by a check valve 84 against the escape of air from the chamber but opening to admit atmospheric pressure for moving the piston 80 when the suction develops the required subatmospheric pressure on the first side. Thus, the operating pressure differential will move the piston 80 to shift the valve 75" and render the wiper unit operative. During this fluid pressure response of the piston 80 a power spring 85 is compressed to function later, when the source of suction is disconnected, to return the piston 80 to its normal position and in so doing to restore the wiper unit control 75" to its wiper parking position. A time delay action retards this parking operation to prolong the wiping cycle a number of strokes beyond the washing cycle. The delay action herein depicted is in the form of an adjustable bleed 86 to regulate the escape of entrapped air ahead of the spring-urged piston.

A manual actuator 87 in the form of a hand knob and a rack and pinion will act through a Bowden wire 87' which abuts the control 75" to shift it for use of the wiper unit in its primary capacity independently of the washer unit. The hand knob contains a push button switch 61" for closing the washer circuit 9, 16, 17. This manual actuator 87 and the automatic coordinating motor 80, 81 thus have provision for play or relative movement to enable the independent functioning of both units. This will also permit the washer unit to be brought into use whenever the wiper unit is already in operation. A more detailed showing of this arrangement of controls is found in the above noted patent and also a later Patent No. 2,769,194.

Interposed in the suction line 74", 82 between the coordinating motor 80, 81 and the intake manifold 11 is a normally closed hydrostatic valve 88 which is responsive to the hydrostatic pressure in the delivery passage 51 from the washer unit. The valve has a seat with a port 89 through which the conduit 82 opens. The seat is also provided with a suction supply port 90, and on the seat slides valving member 91 backed by a spring 92. Arranged in the delivery passage 51 is a hydraulic motor having a small chamber 93 and a diaphragm piston 94 which latter responds to the pressure on the liquid solvent stream as it flows through the chamber from the inlet to the outlet and into the conduit 54 for discharge from the nozzle 55. The valving member 91 is carried by a stem 95 that is guided in a bearing 96 in the valve housing. A head 97 on the stem rests upon the diaphragm 94 under the urge of a coiled spring 98 which latter serves to hold the valving member normally in a position to open the port 89 and thereby to vent the chamber of the coordinating motor to the atmosphere. When responding to the hydrostatic pressure on the diaphragm the valving member 91 will slide upon its seat to an opened position wherein the recess 99 will connect the two ports 89 and 90. This hydrostatic pressure, however, does not manifest itself until the pump plunger 38, Fig. 3, starts to descend under the urge of its power spring 45, which action occurs after the source of suction has been disconnected from the pump motor. The discharge orifice in the nozzle 55, being restricted relative to the size of the delivery line, will immediately cause the hydrostatic pressure to build up quickly for energizing the coordinating motor to start the wiper. The hydrostatic valve, with the coordinating motor, constitute a coordinator unit.

The source of suction 11 is connected to the automatic valve action of the windshield cleaner motor 5" by a passage 14".

In operation, the sequence of unit actions will be started by closing the manual switch 61" to energize the solenoid valve 12 for opening the pump motor chamber to the source of suction and initiating pump operation, as previously described. At this moment the hydrostatic pressure will impress itself on the hydrostatic valve 88 and open the suction line to the coordinating motor 80, 81 to create a pressure difference on its piston to turn on the windshield cleaner. This sequential order follows quickly the start of the liquid application to the windshield to have the wiper take full advantage of the wetting. In succession the three motor springs 45, 98 and 85 act to restore the system components each to its normal pre-cycle status.

The coordinator or coordinator unit 80, 81, 88 is maintained inoperative until after the washer unit has begun its solvent applying stroke and thereafter the wiper is quickly brought into operation and continued in its operation for a predetermined time interval after the washer unit has finished applying the solvent. After the lapse of this time interval the wipers will be arrested and brought to a parked position outside of the field of vision. The action is automatic throughout, following the initial step of closing the control 61", but this sequency of operations will not follow until after the liquid application has started.

The coordinator units illustrated embody a fluid motor which is connected to the source of operating pressure by the hydrostatic valve. Obviously the hydrostatic control may be in the form of an electric switch that is responsive to the discharging liquid solvent to close the circuit of a solenoid as a substitute for the coordinating motor 80, 81, in which event the core or armature of the solenoid will be connected to the windshield cleaner shut-off valve 75", the spring returned armature having an associated dash pot to prolong the wiper action as heretofore set for the piston 80. Should the wiper unit be in operation, as during a light shower, and the wiper tend to cling to the glass because of its semi-dry condition, the washer unit may be actuated as above set forth. If the wiper unit is not operating at its full speed the coordinator will serve to accelerate the wiper for the brief interval of coordinated operation following which the coordinator will return the valve 75" to its preset position as determined by the setting of the manual control. The hydrostatic valve 88 may be mounted in a suitable location such as on the cover 36 of the reservoir.

A review of the foregoing will show that the several illustrated embodiments each provide a coordinated windshield cleaning system wherein the wiper unit is responsive to the washer unit only when the latter provides an initiating hydrostatic pressure therefor. If the washer system fails because of an insufficient supply of liquid solvent, then the wiper unit will remain inactive and avoid a smearing spread of splashed deposit on the windshield which would otherwise render vision therethrough more difficult.

It may thus be seen, that by employing the instant invention, the wiper unit will not operate when the water supply is insufficient. Consequently, the vision through the windshield will not become smeared or made worse by the sweep of a dry wiping blade. An accompanying increase in the safety of and the convenience to the operator of the vehicle will result. The windshield clearing system will respond to a single act on the part of the operator, namely, the touch of the control button, and the cleaning cycle will complete itself without further attention but dependent upon an ample supply of water or other liquid solvent. This is true regardless of the type of washer pump or wiper motor with which the vehicle may be equipped.

The foregoing description has been given in detail for clarity and without thought of limitation since the inventive principles involved are capable of assuming other physical embodiments without departing from the spirit of the invention and the scope of the appended claims.

Having thus disclosed exemplary embodiments thereof, what I claim as my invention is:

1. A windshield clearing system for an automotive vehicle having a source of suction comprising, a pneumatically powered motor for driving a wiper to and fro across the windshield to be cleaned, a conduit interconnecting the source of suction and the motor, a normally closed valve interposed between the conduit and motor, a nozzle for directing a stream of washing fluid toward the windshield, a reservoir for storage of the fluid, means including an operator actuated suction bulb operatively connected to the reservoir for delivering fluid under pressure from the reservoir to the nozzle, a chamber operatively connected to the suction bulb, a flexible diaphragm in said chamber, said diaphragm being deflected upon the delivery of fluid by said means, a bleed valve interposed between said chamber and suction bulb, said bleed valve causing the continued deflection of the diaphragm for a predetermined length of time after said means have ceased delivering fluid, and means operatively connecting said normally closed valve and said diaphragm so that deflection of the diaphragm causes the valve to open, the motor being actuated upon the opening of said normally closed valve.

2. A windshield clearing system comprising, an electric motor for driving a wiper to and fro across the windshield to be cleaned, a nozzle for directing a stream of washing fluid toward the windshield, means to deliver fluid under pressure to the nozzle, solenoid means to actuate the pressure means, a chamber connected to the pressure means, a pressure responsive diaphragm in said chamber, said diaphragm being deflected upon delivery of fluid by said pressure means, an electric circuit for actuating said motor, and normally open switch means connected to the diaphragm, said switch means being included in the electric circuit and closed by deflection of said diaphragm, the motor being actuated upon the closing of said switch means.

3. A windshield clearing system comprising, a motor for driving a wiper to and fro across the windshield to be cleaned, a nozzle for directing a stream of washing fluid toward the windshield, a reservoir for storage of the fluid, means including an operator actuated suction bulb operatively connected by conduit to the reservoir and nozzle for delivering fluid under pressure from the reservoir to the nozzle, and control means responsive to the fluid pressure in the conduit for automatically actuating the motor.

4. A windshield clearing system comprising, an electric motor for driving a wiper to and fro across the windshield to be cleaned, a nozzle for directing a stream of washing fluid toward the windshield, means to deliver fluid under pressure to the nozzle, solenoid means to actuate the pressure means, a chamber connected to the pressure means, a pressure responsive diaphragm in said chamber, said diaphragm being deflected upon delivery of fluid by said pressure means, a bleed valve interposed between the chamber and pressure means, said bleed valve causing the continued deflection of the diaphragm for a predetermined length of time after the pressure means has ceased delivering fluid, an electric circuit for actuating the motor, and normally open switch means connected to the diaphragm, said switch means being included in the electric circuit and closed by deflection of said diaphragm, the motor being actuated upon the closing of said switch means.

5. A windshield clearing system for an automotive vehicle having a source of suction comprising a wiper, a pneumatically powered motor for driving the wiper to and fro across the windshield, a conduit interconnecting the source of suction and the motor, a normally closed valve interposed between the conduit and motor, a nozzle for directing a stream of washing fluid toward the windshield, means to deliver the fluid under pressure to the nozzle, and control means responsive to such delivery of fluid for automatically opening the valve and setting the motor in operation when the pressure means is activated.

6. A windshield clearing system comprising, a wiper, a motor for driving the wiper to and fro across the windshield, a nozzle for directing a stream of washing fluid toward the windshield, means to deliver fluid under pressure to the nozzle, a chamber connected to the pressure means, a pressure responsive diaphragm in said chamber, said diaphragm being deflected upon delivery of fluid by the pressure means, and means actuated by deflection of said diaphragm for starting the motor.

7. A windshield clearing system comprising, an electric motor for driving a wiper to and fro across the windshield to be cleaned, a nozzle for directing a stream of washing fluid toward the windshield, a reservoir for storage of the fluid, means including an operator actuated suction bulb operatively connected to the reservoir for delivering fluid under pressure from the reservoir to the nozzle, a chamber operatively connected to the suction bulb, a flexible diaphragm in said chamber, said diaphragm being deflected upon the delivery of fluid by said means, an electric circuit for actuating the motor, and normally open switch means connected to the diaphragm, said switch means being included in the electric circuit and closed by deflection of said diaphragm, the motor being actuated upon the closing of said switch means.

8. A windshield clearing system comprising, a wiper, a motor for driving the wiper to and fro across the windshield, a nozzle for directing a stream of washing fluid toward the windshield, means to deliver fluid under pressure to the nozzle, a chamber connected to the pressure means, a pressure responsive diaphragm in said chamber, said diaphragm being deflected upon delivery of fluid by the pressure means, a bleed valve interposed between the chamber and pressure means, said bleed valve causing the continued deflection of the diaphragm for a predetermined length of time after the pressure means has ceased delivering fluid, and means actuated by deflection of said diaphragm for starting the motor.

9. A windshield clearing system for an automotive vehicle having a source of suction comprising, a pneumatically powered motor for driving a wiper to and fro across the windshield to be cleaned, a conduit interconnecting the source of suction and the motor, a normally closed valve interposed between the conduit and motor, a nozzle for directing a stream of washing fluid toward the windshield, means to deliver fluid under pressure to the nozzle, solenoid means to actuate the pressure means, a chamber connected to the pressure means, a pressure responsive diaphragm in said chamber, said diaphragm being deflected upon the delivery of fluid by said pressure means, and means operatively connecting said valve and diaphragm so that the deflection of the diaphragm causes the valve to open, the motor being actuated upon the opening of said valve.

10. A windshield clearing system comprising, a wiper, a motor for driving the wiper to and fro across the windshield to be cleaned, means for directing a stream of washing fluid toward the windshield, means to deliver fluid under pressure to the directing means, conduit means interconnecting the pressure means and the nozzle, and operator actuated control means for the system operable to initiate conjoint action of the wiper motor and the pressure means and including means operative upon the existence of fluid pressure in the system for automatically taking over and maintaining the conjoint action for a period following the operator actuation of said control means.

11. A windshield clearing system comprising, a motor for driving a wiper to and fro across the windshield to be cleaned, means for directing a stream of washing fluid toward the windshield, means to deliver fluid under pressure to the directing means, and control means responsive to the delivery of fluid by the pressure means for automatically coordinating the wiper motor and the pressure means for a period of conjoint action and until the fluid pressure becomes ineffective.

12. A windshield clearing system for an automotive vehicle having a source of suction comprising, a pneumatically powered motor for driving a wiper to and fro across the windshield to be cleaned, a conduit interconnecting the source of suction and the motor, a normally closed valve interposed between the conduit and motor, a nozzle for directing a stream of washing fluid toward the windshield, a reservoir for the storage of fluid, means including an operator actuated suction bulb operatively connected to the reservoir for delivering fluid under pressure from the reservoir to the nozzle, a chamber operatively connected to the suction bulb, a flexible diaphragm in said chamber, said diaphragm being deflected upon the delivery of fluid by said means, and means operatively connecting said valve and diaphragm so that deflection of the diaphragm causes the valve to open, the motor being actuated upon the opening of said valve.

13. A windshield clearing system comprising, a motor for driving a wiper to and fro across the windshield to be cleaned, a nozzle for directing a stream of washing fluid toward the windshield, a reservoir for storage of the fluid, means to deliver the fluid under pressure from the reservoir to the nozzle, and control means responsive to the delivery of fluid by the pressure means for automatically coordinating the system for a period of conjoint action of the wiper motor and the pressure means.

14. A windshield clearing system comprising, an electric motor for driving a wiper to and fro across the windshield to be cleaned, a nozzle for directing a stream of washing fluid toward the windshield, a reservoir for storage of the fluid, means including an operator actuated suction bulb operatively connected to the reservoir for delivering fluid under pressure from the reservoir to the nozzle, a chamber operatively connected to the suction bulb, a flexible diaphragm in said chamber, said diaphragm being deflected upon the delivery of fluid by said means, a bleed valve interposed between said chamber means and suction bulb, said bleed valve causing the continued deflection of the diaphragm for a predetermined length of time after said means have ceased delivering fluid, an electric circuit for actuating the motor, and normally open switch means connected to the diaphragm, said switch means being included in the electric circuit and closed by deflection of said diaphragm, the motor being actuated upon the closing of said switch means.

15. A windshield clearing system comprising, a wiper, a motor for driving the wiper to and fro across the windshield, a nozzle for directing a stream of washing fluid toward the windshield, means to deliver fluid under pressure to the nozzle, solenoid means to actuate the pressure means, and control means operative upon the delivery of fluid by the pressure means for automatically actuating the motor.

16. A windshield clearing system for an automotive vehicle having a source of suction comprising, a pneumatically powered motor for driving a wiper to and fro across the windshield to be cleaned, a conduit interconnecting the source of suction and the motor, a normally closed valve interposed between the conduit and motor, a nozzle for directing a stream of washing fluid toward the windshield, means to deliver fluid under pressure to the nozzle, solenoid means to actuate the pressure means, a chamber connected to the pressure means, a pressure responsive diaphragm in said chamber, said diaphragm being deflected upon the delivery of fluid by said pressure means, a bleed valve interposed between the chamber and pressure means, said bleed valve causing the continued deflection of the diaphragm for a predetermined length of time after the pressure means has ceased delivering fluid, and means operatively connecting said valve and diaphragm so that deflection of the diaphragm causes the valve to open, the motor being actuated upon the opening of said valve.

17. A windshield clearing system comprising, a wiper, a motor connected to the wiper for driving the same to and fro across the windshield to be cleaned, a nozzle for directing a stream of washing fluid toward the windshield, a reservoir for storage of the fluid, an operator actuated suction bulb, means connecting said suction bulb with said reservoir and nozzle for delivering fluid under pressure from the reservoir to the nozzle upon actuation of said bulb, and control means responsive to the fluid pressure in said first mentioned means for automatically actuating the motor.

18. A windshield cleaning system comprising a wiper, a motor connected to operate the same, control means for starting and stopping the motor, a washer having a liquid pump, a delivery nozzle receiving liquid under pressure from the pump, and a coordinator means responsive to the liquid pressure and connected to the control means for sustaining operation of the wiper motor until the liquid pressure dissipates.

19. A windshield cleaning system comprising a wiper unit having a motor and a control therefor, a powered actuator operatively connected to the control to move it for starting and stopping the wiper unit, a washer unit having a motor driven liquid pump and means for operating it for a predetermined time interval, a control connected to the actuator and responsive to the pump generated pressure to operate the actuator for starting he wiper unit, and time delay means acting on the actuator control to prolong the wiper operation after the time interval.

20. A windshield cleaning system comprising a wiper unit having a control for starting and stopping the wiper unit, a washer unit having a motor driven liquid pump and operating for a predetermined time interval before stopping, means by which the washer unit may be started, and coordinating means responsive to the hydrostatic pressure on the pump delivery and operatively connecting the control to the washer unit to start the wiper unit after the washer unit has started, said coordinating means including means acting to maintain the wiper unit active for sole wiping operation after the washer unit has stopped and then to arrest the wiper unit.

21. A windshield clearing system comprising a washer unit having a pneumatic pump with a fluid actuated intake stroke and a spring actuated discharge stroke, a control valve for the unit, a pneumatic wiper unit having a fluid operated drive and a control valve therefor, and a coordinating pneumatic motor connected to the wiper drive control valve and having a fluid actuated motor-energizing stroke and a spring actuated wiper arresting stroke, and a control valve associated with the coordinating motor and responsive to the liquid pressure on the discharge stroke for opening the coordinating control valve to render the coordinating motor operative for starting the wiper unit.

22. A windshield clearing system comprising a washer unit having a pump with a suction operated intaking stroke and a spring returned discharge stroke, a control valve for the unit, and a liquid delivery passage having a restricted discharge orifice, a wiper unit having a suction operated motor and a control therefor, a coordinator unit having a motor with a suction actuated and spring returned part connected to the wiper motor control to start and stop the wiper unit, and a spring closed system valve associated with the coordinator motor and responsive to the liquid pressure in the delivery passage for opening the coordinator motor to the suction.

23. A windshield cleaning system comprising a wiper, a motor connected to operate the same, a control for starting and stopping the motor, a washer having a liquid pump with an intake stroke and a discharge stroke, a delivery nozzle receiving liquid under pressure from the pump on its discharge stroke, and a coordinator responsive to the liquid pressure on the discharge stroke and connected to the control for starting the wiper motor.

24. A windshield cleaning system comprising a wiper, a motor connected to operate the same, a control for starting and stopping the motor, a washer having a liquid pump with an intake stroke and a discharge stroke, a delivery nozzle receiving liquid under pressure from the pump on its discharge stroke, a coordinator responsive to the liquid pressure on the discharge stroke and including a motor connected to the control for starting and stopping the wiper motor, and a hydrostatic valve having an inlet connected to the pump discharge and an outlet connected to the nozzle for the flow of the liquid therethrough on its way to the nozzle, and a control for the coordinator motor operable by the hydrostatic valve.

25. A windshield clearing system comprising a washer unit having a pump with a fluid displacing member therein operating on one stroke to intake liquid and on another stroke to discharge liquid, a control for the unit, a liquid delivery passage leading from the pump and having a discharge orifice, a wiper unit having a control, a coordinator unit having a motor connected to the wiper unit control and operable to control the wiper unit operation, and a system control responsive to the hydrostatic pressure provided by said displacing member for energizing the coordinator motor to so control the operation of the wiper unit.

26. A windshield cleaning system comprising a wiper, a motor connected to operate the same, a control for starting and stopping the motor, a washer having a liquid pump, a delivery nozzle receiving liquid under pressure from the pump, a coordinator responsive to the liquid pressure and connected to the control for starting the wiper motor, and spring means operable to actuate the control to arrest the motor upon the dissipation of the liquid pressure.

27. A windshield cleaning system comprising a wiper, a motor connected to operate the same, a control for starting and stopping the motor, a washer having a liquid pump, a delivery nozzle receiving liquid under pressure from the pump, and a coordinator means connected to the control and responsive to the liquid pressure for starting the wiper motor but remaining inoperative upon the failure of the pump to deliver liquid under pressure, said coordinator means including spring means operable to actuate the control to arrest the motor upon the dissipation of the liquid pressure.

28. A windshield cleaning system comprising a wiper, a motor connected to operate the same, a control for starting and stopping the motor, a washer having a liquid pump, a delivery nozzle receiving liquid under pressure from the pump, a coordinator responsive to the liquid pressure and connected to the control for starting the wiper motor, and a time delay means cooperating with the coordinator to continue the wiper operation after the liquid delivery stops.

29. A windshield cleaning system comprising a wiper, a motor connected to operate the same, a control for starting and stopping the motor, a washer having a liquid pump operable for a determinable period of time, a delivery nozzle receiving liquid under pressure from the pump, a coordinator responsive to the liquid pressure and connected to the control for starting the wiper motor, and an adjustable time delay means cooperating with the coordinator to selectively extend the period of wiper operation after the washing period for different numbers of wiping strokes.

30. A windshield cleaning system comprising a wiper, a motor connected to operate the same, a control for starting and stopping the motor, a washer having a liquid pump, a delivery nozzle, a conduit connecting the pump and nozzle to supply liquid under pressure thereto from the pump, and means responsive to the liquid pressure in said conduit to operate the control for starting the wiper motor.

31. A windshield cleaning system comprising a wiper, a motor connected to operate the same, a control for starting the motor, a washer having a liquid pump, a delivery means receiving liquid under pressure from the pump, and a coordinator responsive to the liquid pressure and operatively connected to the control for starting the wiper motor.

32. A windshield clearing system for automotive vehicles comprising, a wiper, a motor for driving said wiper to and fro across an associated windshield, a nozzle for directing a stream of fluid toward said windshield, means for delivering the fluid under pressure to said nozzle, a first control means for setting the motor in operation independently of said pressure means, and a second control means including hydrostatic means for setting the motor in operation concurrently with the actuation of said pressure means, at the termination of the washing operation said second control means returning said motor to the condition of operation prevailing prior to the actuation of said pressure means.

33. A windshield clearing system for automotive vehicles comprising, a wiper, a motor for driving said wiper to and fro across an associated windshield, a nozzle for directing a stream of fluid toward the windshield, electrically actuated means for delivering the fluid under pressure to the nozzle, and control means including hydrostatic means for setting the motor in operation when said pressure means commences to deliver fluid, a predetermined time after the termination of the washing operation said control means returning said motor to the condition of operation prevailing prior to the delivery of fluid by said pressure means.

34. A windshield clearing system for automotive vehicles comprising, a wiper, a variable speed motor for driving said wiper to and fro across an associated windshield, a nozzle for directing a stream of fluid toward said windshield, means for delivering the fluid under pressure to said nozzle, a first control means for setting the motor in operation at a desired speed and independently of said pressure means, and a second control means including hydrostatic means for causing said motor to run at top speed concurrently with the actuation of said pressure means, at the termination of the washing operation said second control means returning said motor to the speed of operation prevailing prior to the actuation of said pressure means.

35. A windshield clearing system for automotive vehicles comprising, a wiper, a variable speed motor for driving said wiper to and fro across an associated windshield, a nozzle for directing a stream of fluid toward the windshield, electrically actuated means for delivering the fluid under pressure to the nozzle, and control means including hydrostatic means for setting the motor in operation at top speed when said pressure means commences to deliver fluid, a predetermined time after the termination of the washing operation said control means returning said motor to the speed of operation prevailing prior to the delivery of fluid by said pressure means.

36. A windshield clearing system for automotive vehicles comprising, a wiper, a motor for driving said wiper to and fro across an associated windshield, a nozzle for directing a stream of fluid toward the windshield, a reservoir for storage of the fluid, an operator operated suction bulb operatively connected to the reservoir for delivering fluid under pressure from said reservoir to the nozzle, a first control means for setting the motor in operation, and a second control means including hydrostatic means and mechanically tied to said first control means for setting said motor in operation concurrently with the delivery of fluid by said suction bulb, a predetermined time after the termination of the washing operation said second control means returning said motor to the condition of operation prevailing prior to the delivery of fluid.

37. A windshield clearing system for automotive vehicles comprising, a wiper, a variable speed motor for driving said wiper to and fro across an associated windshield, a nozzle for directing a stream of fluid toward the windshield, a reservoir for storage of fluid an operator operated suction bulb operatively connected to said reservoir for delivering fluid under pressure from said reservoir to said nozzle, a first control means for setting said motor in operation at a desired speed independently of said fluid delivery means, and a second control means automatically operable to cause said motor to run at top speed concurrently with the delivery of fluid by said suction bulb, a predetermined time after the termination of the washing operation said second control means returning said motor to the speed of operation prevailing prior to such delivery of fluid.

38. A windshield cleaning system comprising a wiper, a motor connected to operate the same, control means for starting and stopping the motor, a washer having a liquid pump, a delivery passage receiving liquid under pressure from the pump, and a coordinator responsive to the liquid pressure and operable to maintain a period of conjoint operation for the pump and the wiper motor.

References Cited in the file of this patent

UNITED STATES PATENTS

| | | |
|---|---|---|
| 2,162,985 | West | June 20, 1939 |
| 2,206,814 | Horton | June 2, 1940 |
| 2,323,470 | Horton et al. | July 6, 1943 |
| 2,617,136 | Rappl | Nov. 11, 1952 |